United States Patent
Liou

(10) Patent No.: US 10,023,718 B2
(45) Date of Patent: Jul. 17, 2018

(54) ACCELERATOR FREE AND HIGH FILLER LOAD NITRILE GLOVE

(71) Applicant: Twolink Sdn Bhd, Shah Alam (MY)

(72) Inventor: Der-Lin Liou, New Taipei (TW)

(73) Assignee: Twolink Sdn Bhd, Shah Alam, Selangor (MY)

( * ) Notice: Subject to any disclaimer, the term of this patent is extended or adjusted under 35 U.S.C. 154(b) by 184 days.

(21) Appl. No.: 15/254,223

(22) Filed: Sep. 1, 2016

(65) Prior Publication Data

US 2018/0016409 A1    Jan. 18, 2018

(30) Foreign Application Priority Data

Jul. 12, 2016    (MY) ................... PI 2016001293

(51) Int. Cl.

| | | |
|---|---|---|
| *A41D 19/015* | (2006.01) | |
| *A41D 19/00* | (2006.01) | |
| *C08K 3/22* | (2006.01) | |
| *C08K 5/053* | (2006.01) | |
| *C08L 13/02* | (2006.01) | |
| *C08K 5/07* | (2006.01) | |
| *C08J 5/02* | (2006.01) | |

(52) U.S. Cl.
CPC ............ *C08K 3/22* (2013.01); *A41D 19/0058* (2013.01); *A41D 19/01529* (2013.01); *C08J 5/02* (2013.01); *C08K 5/053* (2013.01); *C08K 5/07* (2013.01); *C08L 13/02* (2013.01); *A41D 2500/54* (2013.01); *C08J 2313/02* (2013.01); *C08J 2433/02* (2013.01); *C08K 2003/2227* (2013.01); *C08K 2003/2296* (2013.01); *C08K 2201/019* (2013.01)

(58) Field of Classification Search
CPC ......... C08K 5/098; C08J 5/02; C08J 2309/04; C08J 2313/02; C08J 2309/00; C08J 2321/00; C08J 2325/06; C08J 2331/02; C08J 2377/06; C08J 3/24; A41D 19/0058; A41D 13/087; A41D 19/0065; A41D 19/0082; A41D 2300/52; A61B 42/00; A61B 42/10; A61F 2/583
See application file for complete search history.

(56) References Cited

U.S. PATENT DOCUMENTS

| | | | | |
|---|---|---|---|---|
| 2,868,754 | A * | 1/1959 | Urig | C08F 36/04 524/821 |
| 4,888,367 | A * | 12/1989 | Quigley | C08F 8/44 524/108 |
| 5,387,635 | A * | 2/1995 | Rowland | C08F 8/44 524/379 |
| 5,591,803 | A * | 1/1997 | Sullivan | A63B 37/0003 273/DIG. 22 |
| 6,673,872 | B2 * | 1/2004 | van Beek | C08L 71/123 525/390 |
| 6,706,816 | B2 * | 3/2004 | Williams | C08F 20/44 525/192 |
| 7,005,478 | B2 * | 2/2006 | Williams | C08F 20/44 525/192 |
| 7,923,498 | B2 | 4/2011 | Foo | |
| 9,243,117 | B2 * | 1/2016 | Khoo | C08J 5/02 |
| 2005/0221073 | A1 * | 10/2005 | Liou | A41D 19/0065 428/304.4 |
| 2009/0292081 | A1 * | 11/2009 | Suddaby | C08J 3/24 525/370 |
| 2011/0197896 | A1 * | 8/2011 | Liou | A41D 19/0058 128/844 |
| 2011/0198777 | A1 * | 8/2011 | Liou | B29C 41/085 264/209.2 |
| 2012/0246799 | A1 * | 10/2012 | Khoo | C08J 5/02 2/168 |
| 2014/0142211 | A1 * | 5/2014 | Stoever | C08K 3/26 523/105 |
| 2017/0099889 | A1 * | 4/2017 | Liou | C08F 236/12 |
| 2017/0218142 | A1 * | 8/2017 | Foo | C08J 5/005 |
| 2017/0218143 | A1 * | 8/2017 | Foo | C08J 5/005 |

FOREIGN PATENT DOCUMENTS

| | | |
|---|---|---|
| WO | 2004044037 | 5/2004 |
| WO | 2016072835 | 5/2016 |

* cited by examiner

Primary Examiner — Bobby Muromoto, Jr.
(74) Attorney, Agent, or Firm — Hamre, Schumann, Mueller & Larson, P.C.

(57) ABSTRACT

A formulation of nitrile glove made from carboxylated acrylonitrile butadiene elastomer comprising an aluminum and zinc oxide compound as a crosslinker and a metal ion stabilizer without sulfur and accelerator for decreasing type IV allergy risk and providing a cost down method of increasing filler loading ability of carboxylated acrylonitrile butadiene latex.

15 Claims, No Drawings

US 10,023,718 B2

ACCELERATOR FREE AND HIGH FILLER LOAD NITRILE GLOVE

FIELD

The present invention relates to a formulation of nitrile glove made from carboxylated acrylonitrile butadiene elastomer comprising an aluminum and zinc oxide compound as a crosslinker and a metal ion stabilizer without sulfur and accelerator for decreasing type IV allergy risk and providing a cost down method to increase filler loading ability of carboxylated acrylonitrile butadiene latex.

BACKGROUND

Cited patents

U.S. Pat. Nos. 2,868,754, 6,673,872, WO2004044037A1, US20090292081A1, WO2016072835A1, U.S. Pat. Nos. 7,005,478, 7,923,498, US20120246799A1, US20140142211A1

The manufacture of nitrile glove conventionally involved the use of sulfur, accelerators and zinc oxide as crosslinker, among of them, accelerators such as carbamates, thiurams or thiazoles which can potentially cause type IV chemical allergy risk.

U.S. Pat. No. 2,868,754 disclosed a carboxylated acrylonitrile butadiene latex for textile and paper coating application comprising sodium aluminate as crosslinking agent without using sulfur, accelerator and zinc oxide. However, there is no teaching of making nitrile glove.

U.S. Pat. No. 6,673,872 and WO2004044037A1 disclosed an elastomeric article by using polyvalent metal or metal oxide as a sole crosslinker to crosslink carboxylated butadiene copolymer with a temperature lower than 85° C., this approach under a low temperature curing condition required much longer process time that is not an effective method for applying in a commercial continuously running process and the made article with poor durability and chemical resistant problems.

US20090292081A1 and WO2016072835A1 disclosed a carboxylated acrylonitrile butadiene latex without using sulfur and accelerator, by using aluminum compound as crosslinker which comprising retarding anion made from hydroxy-substituted mono carboxylic acid or ketone derivatives, or a polyethylene glycol derivatives to delay aluminum ion react too quick and caused latex gelation, these method provided a possible approach of solving the latex un-stability issue.

U.S. Pat. No. 7,005,478 disclosed a method of a base polymer comprising carboxylic acid derivative and divalent or trivalent metal as crosslinker without using accelerator for making glove, this method provided a better solution compared with using metal ion as a sole crosslinker, but there is no teaching of how to overcome the polymer un-stability issue caused by applying trivalent metal and carboxylic acid derivative in a continuously dipping process.

U.S. Pat. No. 7,923,498 disclosed a carboxylated acrylonitrile butadiene latex by using sulfur and zinc oxide as crosslinking agent without accelerator to make glove. This approach without using accelerator to activate sulfur for crosslinking with polymer that required a much longer time and consumed large volume energy for sulfur to create covalent bond with polymer, it is not a feasible method to apply in continuously dipping process of making glove.

U.S. Pat. No. 9,243,117 disclosed a formulation for making an elastomeric rubber thin film without using sulfur and accelerators comprising a premixed a 2-8% methacrylic acid carboxylated acrylonitrile butadiene latex or a self-crosslinked carboxylated acrylonitrile butadiene latex and a metal oxide and a pH adjuster. The methacrylic acid dosage higher than 8% of carboxylated acrylonitrile butadiene latex normally having latex un-stable and high viscosity problems, that is why, carboxylic acid content is within 4-8% range of the most of commercial available carboxylated acrylonitrile butadiene latex, this approach lack of explain how to overcome the latex un-stability and viscosity issues caused by premixed methacrylic acid.

US20140142211A disclosed an elastomeric article made by dipping method and the elastomer is loading 1.0-40.0 Parts per hundred rubber (phr) precipitated calcium carbonate (PCC) with a preferred particle size less than 1.0 μm. This approach using convention sulfur, accelerator and zinc oxide crosslinking formulation, when PCC loading in carboxylated acrylonitrile butadiene latex, it is not able to form a crosslinking bond with the polymer chain, so that if the filler loading dosage is beyond carboxylated polymer wet gelling strength that means polymer is no longer able to hold on the weight of filler in a wet condition that make the made article come out with pin holes and sometimes even caused film split off or torn during dipping process. In actually situation, it is not able to use a higher than 10.0 phr PCC loading in carboxylated acrylonitrile butadiene latex in a continuously dipping process for making a consistently qualified glove without pin hole and particle sedimentation problems.

Nitrile glove is not containing natural rubber protein that caused allergy type I risk and with better strength and chemical resistant than natural rubber, so that it replaced the natural rubber glove and dominate the market. In order to increase the price competition ability that the glove industry has been making many efforts of trying to increase filler loading ability of nitrile glove, but until today there is no successful approach able to overcoming this difficulty. Calcium carbonate, clay, aluminate silicate or silica are most commonly used fillers in rubber industry, it is normally used 10.0-40.0 phr of calcium carbonate in making natural rubber glove, but for nitrile glove is a different story. In the glove dipping process, the compounded carboxylate acrylonitrile butadiene latex mixture with more than 5.0-10.0 phr of calcium carbonate or silica filler caused particles sedimentation, latex gelation and lumps problems, and the made gloves is poor in pin holes, physical performances and acid resistant. Therefore, it is still having a continuous requirement for developing a nitrile glove without sulfur and accelerator and a method can increasing filler loading ability of carboxylated acrylonitrile butadiene latex for cost down purpose.

SUMMARY

The present invention provides a formulation of making a nitrile glove by using an aluminum compound as a crosslinker, a metal ion stabilizer and a pH adjustor without comprising sulfur and accelerator, and further using aluminum compound for reacting with calcium carbonate or silica filler to form a calcium aluminum cement complex bonding with carboxylated acrylonitrile butadiene polymer chain to overcome the difficulty of nitrile glove not able to loading high dosage filler.

The conventional crosslinking method applied accelerator to boost sulfur function with butadiene to form covalent bond and zinc oxide to function with carboxylic acid to form ionic bond of carboxylated nitrile polymer chain. To prevent from the accelerator allergy risk that many approaches disclosed without using sulfur and accelerators, among these approaches, one category is applying acid base compound to function with carboxylic acid to form covalent bond and further with a zinc oxide to function carboxylic acid to form ionic bond of carboxylated acrylonitrile butadiene latex polymer chain, another category is applying a trivalent metal ion which normally is an aluminum ion to form ionic bond and without covalent bond formed. Comparing between zinc and aluminum metal ion, zinc metal ion is more stable than aluminum metal ion and would not causing viscosity increased, early gelation or lumps problems of carboxylated acrylonitrile butadiene latex. Zinc metal ion which commonly used zinc oxide, if zinc oxide is used alone without aluminum metal ion, the low dosage zinc oxide caused glove with poor wearing durability, water and chemical resistant problems, and if with too high dosage, the made glove become too stiff and not comfortable to wear. For Aluminum metal ion compound such as aluminum oxide, aluminum chloride, aluminum hydroxide and sodium aluminate are commonly used, among of them, sodium aluminate is preferred in the present invention, because it is a alkali water solution and user-friendly without particle sedimentation problem, but it required sufficiently dilution before adding in carboxylated nitrile latex to prevent from early latex gelation caused by pH shocking during compounding process. Aluminum metal ion can used alone without zinc metal ion, because it is a trivalent metal ion that can form higher ionic bond density than bivalent metal ion, but a low dosage of aluminum ion still caused glove has the similar defects as above mentioned zinc oxide, if with a proper dosage range that can make a satisfied good quantity glove, aluminum ion would react too quick to de-stabilize carboxylated nitrile latex and caused viscosity increased, early gelation and lumps problems in the compounding stage and continuously dipping process, so that it is required a stabilizer to overcome these problems.

In the present invention by using a chelating agent and a polyol compound acts as the metal ion stabilizer, the chelating agent is selected from the group consisting of aminothylethanolamine, benzotriazole, catechol, citric acid, diethylenetriamine, dimethylglyoxime, dimercapol, dimercaptosuccinic acid, diphenylethylendiamine, 1,2-ethanedithol, ethylenediamine, ethylenediaminetetraacetic acid, glycine, gluconic acid, glyxoal, glyxoal-bis(mesitylimine), sodium diethyldithiocarbamate, sodium polyaspartate, iminodiacetic acid, nitrilotriacetic acid, pentetic acid, phenanthyoline, phosphonate, tetramethylethylenediamine, tetraphenylporphyrin, trisodium citrate or their mixture. The polyol compound is selected form group consisting of maltitol, sorbitol, xylitol, erythritol, isomalt, glycerin, ethylene glycol, sucrose, polypropylene glycol, poly(tetramethylene ether) glycol or their mixture. The chelating agent function with metal ion to form chelate complex is more stable in carboxylated acrylonitrile butadiene latex, but some of acid base chelating agent may also function with carboxylic acid of carboxylated acrylonitrile butadiene polymer to form covalent bond and caused latex destabilization problem, so that by using a polyol compound to detain the reaction of the covalent bond formed and control the reaction only be activated in a higher temperature condition. The polyol compound also possible to use alone without chelating agent, although, it maybe not as effective as chelating agent, but it still able to improve the aluminum metal ion toleration ability of carboxylated acrylonitrile butadiene latex. By using sodium aluminate or zinc oxide or their mixture as a metal ion crosslinker, and a chelating agent or a polyol compound or their mixture as a metal ion stabilizer that a nitrile glove is free of sulfur and accelerator can be made by the present invention.

The previously calcium carbonate or silica slurry dispersion is made by wet grinding method, a sodium polyacrylate as a thickener to improve suspension of particles in latex. Commonly, a 10.0-40.0 phr loading of ground calcium carbonate (GCC) with a particle size less than 5.0 μm can be used in making natural rubber glove. For making nitrile glove about 5.0 phr PCC or less than 10.0 phr silica loading with a particle size less than 3.0 μm can be used, but if out of these loading range, the particle sedimentation, latex gelation and glove pin hole would dramatically increasing and further affect glove physical performances and acid resistant. In order to increase the loading ability of carboxylated acrylonitrile butadiene latex, it required to improve the bonding strength between filler and carboxylated acrylonitrile butadiene polymer chain. Sodium aluminate is a highly active aluminum compound compare to aluminum oxide and aluminum hydroxide, and it is able to react with calcium carbonate or silica under a normal room temperature condition to form calcium aluminate cement complex. Surprisingly, when blended 2.5 phr of present invention crosslinker and stabilizer mixture with commonly used 40.0 phr GCC with a particle size less than 5.0 μm carboxylated nitrile latex to make nitrile glove, we found the compounded carboxylated acrylonitrile butadiene latex mixture remained in a stable condition without gelation or lumps problems and the made glove without pin hole and with a good physical performances. Without by any theory, we believed that one end of sodium aluminate function with carboxylic acid of carboxylated acrylonitrile butadiene polymer chain to form ionic bond, and another end function with GCC to form calcium aluminate cement complex to provide a better bonding with carboxylated acrylonitrile butadiene polymer chain without causing particle sedimentation, latex gelation and glove pin holes problems. We further examined the impact of different particle size, as a conclusion that the smaller of particle size, the better of glove physical performances and acid resistant and less pin holes and sedimentation. It is believed that the smaller particle size filler with a bigger surface area can create a more effective reaction with sodium aluminate to form calcium aluminate cement complex compare to the larger particle size filler, and the smaller size filler also has better suspension and dispersing abilities in the carboxylated acrylonitrile butadiene latex so that the sedimentation problem is also improved. In the present invention, the preferred filler particle size is less than 5.0 μm and more preferred less than 3.0 μm and the preferred filler particle is PCC, GCC and silica and more preferred GCC with a more competitive price advantage. Without consideration of price issue, the PCC and silica with a higher purity composition and lower density features are more preferred. The calcium aluminate cement complex can be made during calcium carbonate or silica wet grinding process by blending with the present invention crosslinker, stabilizer and sodium arylsulfonic acid or a sodium polyacrylate or their mixture as dispersing agent into a one-pack compound dispersion to simplify the latex compounding process, or can be individually adding in carboxylated acrylonitrile butadiene latex during latex compounding process.

The pH adjustor such as potassium hydroxide, sodium hydroxide and ammonia is used to adjust compounded carboxylated acrylonitrile butadiene latex mixture pH value. The higher of pH value, the glove performance with higher modulus and more stiff caused by the alkali speed up metal ion bond formed; the lower pH value of acidity condition is more benefited to covalent bond formed, the glove is softer than high pH made glove, the suitable pH value range is about 9-11 of compounded carboxylated acrylonitrile butadiene latex of the present invention. Other additives maybe selected from the group consisting of emulsifying agents, thickener, antifoam agents, biocide agents, antioxidants, waxes, titanium dioxide, color pigment or their mixture. These additives are conventional used chemicals in nitrile glove making process, the dosage of the additives depending on the latex brand, total solid content, major ingredient composition formulation, dipping process and customers' requirements.

DETAILED DESCRIPTION

To preparing the compounded carboxylated acrylonitrile butadiene latex mixture for manufacturing nitrile glove of the present invention, it selected from commercial available carboxylated acrylonitrile butadiene latex, and most of carboxylated acrylonitrile butadiene latex applying in industry is 45% solid content and with a component dosage range based on solid content as 20-40% acrylonitrile, 52-76% butadiene, 4-8% carboxylic acid. The compounded carboxylated butadiene latex mixture comprising a general ingredient formulation of present invention is showing in TABLE 1.

TABLE 1

| Ingredient | Parts per hundred rubber (phr) |
| --- | --- |
| Carboxylated acrylonitrile elastomer | 100 |
| Metal ion compound crosslinker | 0.5-5 |
| metal ion stabilizer | 0.2-2.5 |
| filler | 5.0-40.0 |
| filler dispersing agent | 0.1-1.0 |
| Process additives | Proper amount |
| pH adjuster | Adjust pH to 9-11 |
| Water | Adjust total solid content to 10-35% |

The prevent invention nitrile glove is made by following step:

A) A cleaned ceramic glove former dip in a water base coagulant solution comprising 10-35% calcium nitrate and optional with stripping agent such as calcium stearate or calcium carbonate, wetting agent and dispersing agent.

B) Drying coagulant and dip in a compounded carboxylated acrylonitrile butadiene latex mixture to form a layer of film on the former or optional dip another latex mixture to get the desired film thickness.

C) Partially drying the film and dip in worm water to leach out the impurities such as calcium nitrate and surfactants, and curling the cuff area film into a bead.

D) Curing the film in oven by hot air with temperature about 110-130° C. for 20-25 minutes.

E) The film now is a nitrile glove and treated by chlorination process for de-sticky, and then dry and strip the glove from the former.

EXAMPLE I

A commercial carboxylated acrylonitrile butadiene latex comprising about 26% of acrylonitrile, 68% butadiene and 6% of methacrylic acid is selected, and the compounded carboxylated acrylonitrile butadiene latex mixture's ingredient formulation is showing in TABLE 2.

TABLE 2

| | phr | | | |
| --- | --- | --- | --- | --- |
| Ingredient | Sample 1 | Sample 2 | Sample 3 | Sample 4 |
| Carboxylated nitrile latex | 100.0 | 100.0 | 100.0 | 100.0 |
| Sodium aluminate | 1.0 | 1.0 | 1.0 | 1.0 |
| Zinc oxide | | 0.5 | | 1.0 |
| Citric acid | 0.5 | 0.5 | 0.5 | 0.5 |
| Glycerin | 0.5 | 0.5 | 0.5 | 0.0 |
| Calcium carbonate | | | 30.0 | 30.0 |
| Sodium polyacrylate | | | 0.3 | 0.3 |
| sodium arylsulfonic acid | | | 0.03 | 0.03 |
| Potassium hydroxide | Adjust pH to 10.0 | Adjust pH to 10.0 | Adjust pH to 10.0 | Adjust pH to 10.0 |

Citric acid is diluted with water to make 30% solution and mixing with 30% glycerin solution for preparing the metal ion stabilizer, the stabilizer mixture is slowly adding in diluted 5% sodium aluminate solution and agitating for one hours, and then the mixture is slowly adding in the diluted 30% carboxylated acrylonitrile butadiene latex. In case of calcium carbonate or zinc oxide are used that can be pre-mixed with sodium polyacrylate and sodium arylsulfonic acid in the wet grinding process and diluted into a 30% dispersion and then adding in latex, and then adding the proper dosage diluted process additives such as emulsifying agents, thickener, antifoam agents, biocide agents, antioxidants, waxes, titanium dioxide, color pigment, and then adding a diluted 5% potassium hydroxide solution to adjust latex pH to about 10.0, and with water to dilute compounded carboxylated acrylonitrile butadiene latex mixture to 20% total solid content, and keep on agitating 48 hours for maturation. The sample gloves made by above mentioned steps with a production curing temperature 125° C. for 22 minutes. TABLE 3 showing the sample glove thickness, test result of durability and physical performances, the durability test is carried on by 6 persons wearing individual glove and operating in room condition until the glove broken and record the average wearing time. Physical performances before aging is the glove tested after 24 hours stripping from former and following to ASTM 3577, ASTM D6319 and ASTM D412 test method.

TABLE 3

| | | | Physical performance before aging | | |
| --- | --- | --- | --- | --- | --- |
| Sample | Thickness (mm) | Durability (time) | Tensile Strength at Break (Mpa) | Tensile Strength at 500% (Mpa) | Elongation at Break (%) |
| 1 | 0.10 | >4 hrs | 24.7-26.8 | 6.8-7.2 | 745-766 |
| 2 | 0.10 | >4 hrs | 28.3-30.4 | 12.1-13.2 | 625-632 |
| 3 | 0.10 | >4 hrs | 21.1-22.5 | 8.2-8.9 | 673-683 |
| 4 | 0.10 | >4 hrs | 27.6-28.8 | 17.2-19.4 | 587-620 |

Examined TABLE 3 test result, Sample 1 glove has similar tensile strength and durability, lower modulus and better elongation and softness comparing to conventional sulfur crosslinking method. Sample 2 formulation with additional zinc oxide compare to Sample 1, and the made glove tensile strength and modulus is increased and elongation decreased. Sample 3 glove made by similar formulation of crosslinker and stabilizer plus with additional 30.0 phr calcium carbonate and 0.33 phr filler dispersing agent, the made glove tensile strength and elongation decreased and modulus increased comparing to Sample 1 glove, and the glove remain a satisfied physical performances without pin hole, sedimentation and latex destabilization problems. When we extending the Sample 3 compounded carboxylated acrylonitrile butadiene latex mixture maturation time from 48 hours to 72 hours that we found out the made glove tensile strength and modulus decreased about 10% comparing to 48 hours made glove. It is believed that the sodium aluminate function with calcium carbonate to form calcium aluminate cement complex is faster than function with carboxylic acid of carboxylated acrylonitrile butadiene polymer chain to form ionic bond in a normal temperature condition, as the longer of maturation time, the less of ionic bond formed and caused tensile strength dropping, in order to compensate the consumed aluminum ion used in forming calcium aluminate cement complex by adding additional zinc oxide or sodium aluminate about 8-12 hours before the end of maturation time is able to improve the glove tensile strength, and as a result that the Sample 4 glove tensile strength and modulus is increased and elongation decreased accordingly compare to Sample 3 glove.

EXAMPLE 2

The carboxylated acrylonitrile butadiene latex, compounding process, glove making process and gloves test method is the same as EXAMPLE 1 described. Another example compounded carboxylated acrylonitrile butadiene latex mixture ingredient formulation is showing in TABLE 4.

TABLE 4

| Ingredient | phr | | | |
|---|---|---|---|---|
| | Sample 5 | Sample 6 | Sample 7 | Sample 8 |
| Carboxylated nitrile latex | 100.0 | 100.0 | 100.0 | 100.0 |
| Sodium aluminate | 1.0 | 1.0 | 1.0 | 1.0 |
| Zinc oxide | | 0.5 | | 1.0 |
| glyxoal | 0.4 | 0.4 | 0.4 | 0.4 |
| Sorbitol | 0.7 | 0.7 | 0.7 | 0.7 |
| Calcium carbonate | | | 30.0 | 30.0 |
| Sodium polyacrylate | | | 0.3 | 0.3 |
| sodium arylsulfonic acid | | | 0.03 | 0.03 |
| Potassium hydroxide | Adjust pH to 10.0 | Adjust pH to 10.0 | Adjust pH to 10.0 | Adjust pH to 10.0 |

In this example, the metal ion stabilizer is made by 70% sorbitol mixed with 40% glyxoal and heated to 70-80° C. and held for 4 hours, and after cooling to room temperature, the stabilizer mixture slowly adding in 50% sodium aluminate solution under a controlling temperature below 30° C. to make a one-pack crosslinker mixture for simplifying latex compounding process and further diluted into 5% solid content, and then slowly adding in carboxylated acrylonitrile butadiene latex. The rest of additives compounding steps as EXAMPLE 1 described. The made sample gloves test result is showing in TABLE 5.

TABLE 5

| | | | Physical performance before aging | | |
|---|---|---|---|---|---|
| Sample | Thickness (mm) | Durability (time) | Tensile Strength at Break (Mpa) | Tensile Strength at 500% (Mpa) | Elongation at Break (%) |
| 5 | 0.10 | >4 hrs | 24.2-25.8 | 6.3-6.8 | 767-782 |
| 6 | 0.10 | >4 hrs | 26.6-28.1 | 11.7-12.5 | 632-647 |
| 7 | 0.10 | >4 hrs | 21.5-22.2 | 7.8-8.4 | 683-692 |
| 8 | 0.10 | >4 hrs | 29.6-32.4 | 14.3-15.6 | 601-615 |

As a conclusion that EXAMPLE 1 and EXAMPLE 2 compounded carboxylated acrylonitrile butadiene latex mixture is in a good stable condition without particle sedimentation and latex de-stability problems in the compounding and dipping process stages, and the made sample glove with a satisfied physical performances and durability without pin hole issue. Therefore, the present invention provide a feasible method in making sulfur and accelerator free nitrile glove and further cost down by increasing filler loading capacity of carboxylated acrylonitrile butadiene latex.

While the invention has been described with respect to a preferred embodiments, variations, modifications would be apparent to one of ordinary skill in the art without departing from the spirit of the invention.

The present invention claimed is:

1. A nitrile glove made from a compounded carboxylated acrylonitrile butadiene latex mixture is not using sulfur and accelerators with a formulation comprising
   100.0 phr of carboxylated acrylonitrile butadiene elastomer,
   0.5-5.0 phr of an aluminate compound or a zinc oxide or their mixture acts as a metal ion crosslinker,
   0.2-2.5 phr of a chelating agent or a polyol compound or their mixture acts as a metal ion stabilizer,
   0.2-2.0 phr of an alkali salt compound acts as pH adjustor to adjust compounded carboxylated acrylonitrile butadiene latex mixture pH range to 9-11.

2. A nitrile glove made from a compounded carboxylated acrylonitrile butadiene latex mixture is not using sulfur and accelerators with a formulation comprising
   100.0 phr of carboxylated acrylonitrile butadiene elastomer,
   0.5-5.0 phr of an aluminate compound or a zinc oxide or their mixture acts as a metal ion crosslinker,
   0.2-2.5 phr of a chelating agent or a polyol compound or their mixture acts as a metal ion stabilizer,
   0.2-2.0 phr of an alkali salt compound acts as pH adjustor to adjust compounded carboxylated acrylonitrile butadiene latex mixture pH range to 9-11,
   5.0-40.0 phr of a calcium carbonate or a silica or their mixture acts as a filler,
   0.1-1.0 phr of a sodium arylsulfonic acid or a sodium polyacrylate or their mixture acts as a filler dispersing agent.

3. According to claim 1, wherein the carboxylated acrylonitrile butadiene elastomer comprising 20-40% acrylonitrile, 52-76% butadiene, 4-8% carboxylic acid by solid weight.

4. According to claim 1, where in the aluminum compound is aluminum oxide or aluminum hydroxide or sodium aluminate or their mixture, and more preferred sodium aluminate.

5. According to claim 1, wherein the chelating agent is selected from the group consisting of aminothyletha-nolamine, benzotriazole, catechol, citric acid, diethylenetri-amine, dimethylglyoxime, dimercapol, dimercaptosuccinic acid, diphenylethylendiamine, 1,2-ethanedithol, ethylenediamine, ethylenediaminetetraacetic acid, glycine, gluconic acid, glyxoal, glyxoal-bis(mesitylimine), sodium diethyldithiocarbamate, sodium polyaspartate, iminodiacetic acid, nitrilotriacetic acid, pentetic acid, phenanthyoline, phosphonate, tetramethylethylenediamine, tetraphenylporphyrin, tri-sodium citrate or their mixture, the polyol compound is selected form group consisting of maltitol, sorbitol, xylitol, erythritol, isomalt, glycerin, ethylene glycol, sucrose, polypropylene glycol, poly(tetramethylene ether) glycol or their mixture thereof.

6. According to claim 1, wherein the pH adjustor is potassium hydroxide, sodium hydroxide, ammonia or their mixture and more preferred potassium hydroxide.

7. According to claim 2, wherein the filler is preferred with a particle size less than 5.0 μm and more preferred less than 3.0 μm.

8. According to claim 1, wherein the formulation is further comprising the additives selected from the group consisting of emulsifying agents, thickener, antifoam agents, biocide agents, antioxidants, waxes, titanium dioxide, color pigment or their mixture thereof.

9. According to claim 1, wherein the nitrile glove is made by a dipping method and having a thickness about 0.05-0.5 mm, tensile stress about 15-40 MPa, tensile stress at 500% stretch about 5-30 Mpa and elongation to break about 450-800%.

10. According to claim 2, wherein the carboxylated acrylonitrile butadiene elastomer comprising 20-40% acrylonitrile, 52-76% butadiene, 4-8% carboxylic acid by solid weight.

11. According to claim 2, where in the aluminum compound is aluminum oxide or aluminum hydroxide or sodium aluminate or their mixture, and more preferred sodium aluminate.

12. According to claim 2, wherein the chelating agent is selected from the group consisting of aminothylethanolamine, benzotriazole, catechol, citric acid, diethylenetriamine, dimethylglyoxime, dimercapol, dimercaptosuccinic acid, diphenylethylendiamine, 1,2-ethanedithol, ethylenediamine, ethylenediaminetetraacetic acid, glycine, gluconic acid, glyxoal, glyxoal-bis(mesitylimine), sodium diethyldithiocarbamate, sodium polyaspartate, iminodiacetic acid, nitrilotriacetic acid, pentetic acid, phenanthyoline, phosphonate, tetramethylethylenediamine, tetraphenylporphyrin, trisodium citrate or their mixture, the polyol compound is selected form group consisting of maltitol, sorbitol, xylitol, erythritol, isomalt, glycerin, ethylene glycol, sucrose, polypropylene glycol, poly(tetramethylene ether) glycol or their mixture thereof.

13. According to claim 2, wherein the pH adjustor is potassium hydroxide, sodium hydroxide, ammonia or their mixture and more preferred potassium hydroxide.

14. According to claim 2, wherein the formulation is further comprising the additives selected from the group consisting of emulsifying agents, thickener, antifoam agents, biocide agents, antioxidants, waxes, titanium dioxide, color pigment or their mixture thereof.

15. According to claim 2, wherein the nitrile glove is made by a dipping method and having a thickness about 0.05-0.5 mm, tensile stress about 15-40 MPa, tensile stress at 500% stretch about 5-30 Mpa and elongation to break about 450-800%.

* * * * *